United States Patent [19]

Saigusa

[11] Patent Number: 4,869,125
[45] Date of Patent: Sep. 26, 1989

[54] ROTARY OIL DAMPER

[75] Inventor: Yoshiaki Saigusa, Yokohama, Japan

[73] Assignee: Nifco Inc., Yokohama, Japan

[21] Appl. No.: 253,683

[22] Filed: Oct. 5, 1988

[30] Foreign Application Priority Data

Oct. 8, 1987 [JP] Japan .................. 62-154274[U]

[51] Int. Cl.$^4$ ............................................. F16D 57/00
[52] U.S. Cl. ........................................ 74/574; 188/290
[58] Field of Search .............. 188/290, 264 E, 294; 296/37.9; 16/82; 74/574, 572

[56] References Cited

U.S. PATENT DOCUMENTS

| | | | |
|---|---|---|---|
| 4,426,752 | 1/1984 | Nakayama | 16/82 |
| 4,513,473 | 4/1985 | Omata | 188/290 |
| 4,527,675 | 7/1985 | Omata | 188/290 |
| 4,614,004 | 9/1986 | Oshida | 188/290 |
| 4,653,616 | 3/1987 | Mizusawa | 188/290 |
| 4,691,589 | 9/1987 | Arakawa | 74/574 |
| 4,694,530 | 9/1987 | Foggini | 188/290 |

Primary Examiner—Gary L. Smith
Assistant Examiner—Flemming Saether
Attorney, Agent, or Firm—Richard Bushnell

[57] ABSTRACT

A rotary oil damper comprises a cylindrical body having an engagement projection formed over the entire inner periphery adjacent to its open end and a rotary member fitted in the cylindrical body and having a ring-like engagement projection engaged with the engagement projection of the cylindrical body to retain the rotary member against detachment from the cylindrical body.

2 Claims, 2 Drawing Sheets

ROTARY OIL DAMPER

BACKGROUND OF THE INVENTION

1. Field of the Invention

This invention relates to a rotary oil damper and, more particularly, to an oil damper with oil leakage prevention means.

2. Prior Art Statement

There have been proposed many rotary oil dampers of this type, for instance as disclosed in U.S. Pat. Nos. 4,527,675, 4,614,004, 4,691,589 and 4,691,811.

FIGS. 7 and 8 show a typical two-piece oil damper among the proposed oil dampers. Referring to these Figures, the illustrated oil damper comprises a cylindrical body 1 consisting of a plastic injection molding and open at one end and a rotary member 2 also consisting of a plastic injection molding and rotatably fitted in the cylindrical body 1. An end portion of the rotary member 2 projecting from the cylindrical body 1 has an integral gear 3.

An operating fluid, e.g., viscous grease, is provided in the space between the cylindrical body 1 and the rotary member 2. With the gear 3 meshed with a gear provided on a separate rotary part, resistance against rotation of the separate rotary part is produced by the viscosity of the operating fluid, thus effecting control of rate of rotation of the rotational part.

With this structure, however, the rotary member 2 is merely fitted in the cylindrical body 1. Therefore, the rotary member 2 is liable to be easily withdrawn when it experiences an external force applied in the direction of withdrawing it. Besides, the operating fluid filling the space between the cylindrical body 1 and the rotary member 2 is exposed to the outside from the open end of the cylindrical body 1, which may result in variations of the operating torque over long use. Further, leaking operating fluid is liable to cause contamination.

As measures against these problems, it has been proposed to provide the cylindrical body 1 and rotary member 2 with double-wall cylindrical engagement portions so that it is more difficult for the operating fluid to leak out. Also, there has been developed a structure, in which the edge of the open end of the cylindrical body 1 is formed with a local engagement projection formed with an undercut, and this engagement projection and an engagement projection formed on the outer periphery of the rotary member 2 are engaged with each other to lock the rotary member 2 against detachment.

In the above structures, however, the open end of the cylindrical body remains open so that it is essentially impossible to perfectly prevent the leakage of the operating fluid.

OBJECT AND SUMMARY OF THE INVENTION

The object of the invention is to overcome the above drawbacks and to provide a rotary oil damper which can reliably prevent leakage of operating fluid and also has a function of retaining the rotary member against detachment.

To attain the above object of the invention, there is provided a rotary oil damper which comprises a cylindrical body open at one end and a rotary member rotatably fitted in the cylindrical body, and in which the inner periphery of the cylindrical body is formed adjacent to the edge of the open end with an engagement projection formed by forming an undercut while the outer periphery of the rotary member is formed with a ring-like engagement projection engaged with the aforesaid engagement projection to retain the rotary member against detachment from the cylindrical body.

With this structure, with the engagement between the engagement projection formed over the entire inner periphery of the cylindrical body adjacent to the edge of the open end and the ring-like engagement projection formed on the outer periphery of the rotary member, the gap at the open end of the cylindrical body is perfectly closed and, moreover, the rotary member is more securely retained.

The above and other objects and features of the invention will become more apparent from the following detailed description with reference to the accompanying drawings.

DETAILED DESCRIPTION OF THE PREFERRED EMBODIMENT

Figure 1:
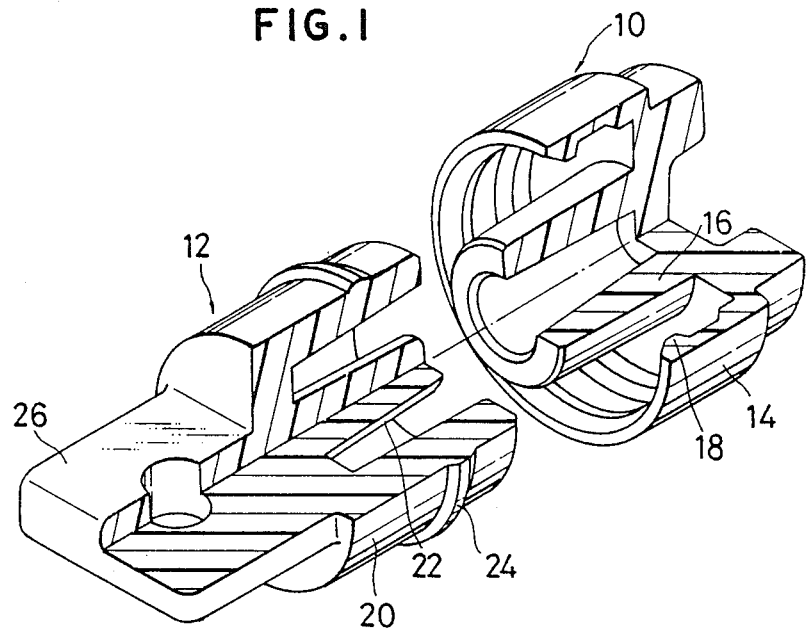
FIG. 1 is an exploded perspective view, partly in section, showing an embodiment of the rotary oil damper according to the invention.
Figure 2:
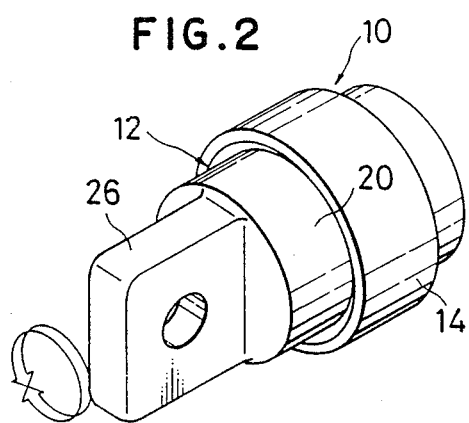
FIG. 2 is a perspective view showing the rotary oil damper of FIG. 1 in the assembled state.

FIGS. 1 to 6 show an embodiment of the rotary oil damper according to the invention. The rotary oil damper comprises a cylindrical body 10 consisting of a plastic injection molding and a rotary member 12 also consisting of a plastic injection molding rotatably fitted in the cylindrical body 10.

The cylindrical body 10 has a double-wall cylindrical structure having outer and inner cylindrical portions 14 and 16. The inner cylindrical portion 16 is hollow and coaxially spaced apart from the inner periphery of the outer cylindrical portion 16 to define a predetermined gap.

The inner periphery of the outer cylindrical portion 14 is formed adjacent to the edge of its open end with an engagement projection 18 formed by forming an undercut.

The shape of the engagement projection 18 is designed with due considerations to the elasticity of the resin material and the mold release slope.

The rotary member 12 has a structure conforming to the double-wall cylindrical structure of the cylindrical body 10. More specifically, it has an outer cylindrical portion 20 fitted in the outer cylindrical portion 14 and an inner cylindrical portion 22 spaced apart from the inner periphery of the outer cylindrical portion 20 by a predetermined gap and fitted in the inner cylindrical portion 16 of the cylindrical body 10. The outer periphery of the outer cylindrical portion 20 of the rotary member 12 is formed with a ring-like engagement projection 24 which is engaged with the inner side of the engagement projection 18 of the cylindrical body 10.

The rotary member 12 having the above structure has an operating portion 26 integrally extending from one end.

The operating portion 26 is coupled to a rotor (not shown) which is the subject of control and rotated either directly or via a gear train as in the prior art example described earlier.

Instead of the operating portion 26, any other mechanical element capable of transmitting a torque, e.g., a gear, may be formed integrally at the end of the rotary member 12.

Figure 3:
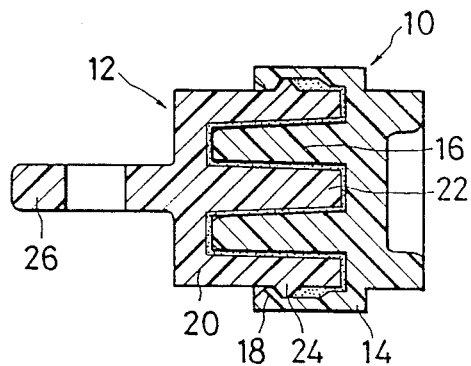
FIG. 3 is a sectional view showing the rotary oil damper of FIG. 1 in the assembled state.
Figure 4:
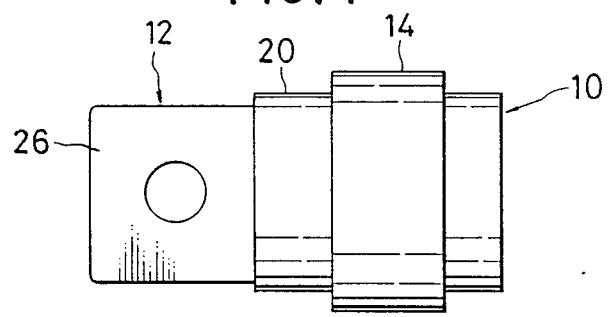
FIG. 4 is a front view showing the rotary oil damper of FIG. 1 in the assembled state.
Figure 5:
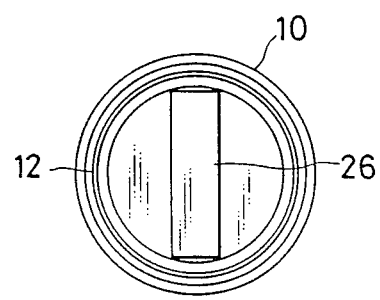
FIG. 5 is a left side view showing the rotary oil damper of FIG. 1 in the assembled state.
Figure 6:
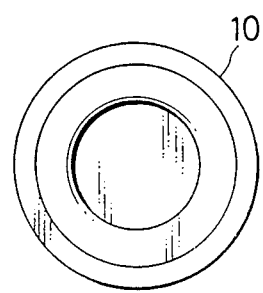
FIG. 6 is a right side view showing the rotary oil damper of FIG. 1 in the assembled state.
Figure 7:
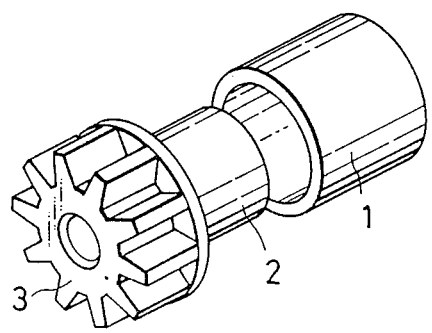
FIG. 7 is an exploded perspective view showing a prior art rotary oil damper.
Figure 8:
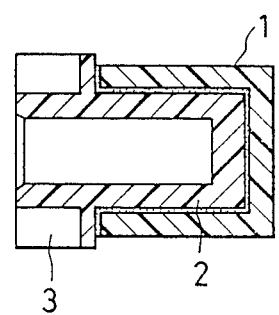
FIG. 8 is a sectional view showing the rotary oil damper of FIG. 7 in the assembled state.

In the construction described above, when fitting the rotary member 12 in the cylindrical body 10, the operating fluid is preliminarily coated on the sliding surfaces of the two parts at clearance gaps A therebetween as shown in FIG. 3, before the former is inserted into the latter. As the rotary member 12 is inserted in this state, the engagement projection 24 strikes the engagement projection 18. By further inserting the rotary member 12 in this state, the engagement projection 24 is elastically contracted while the engagement projection 18 is elastically spread, so that the two engagement projections 18 and 24 are engaged with each other. As soon as the engagement projections 18 and 24 clear the top of each other, they elastically restore to their initial states. Thus, as shown in FIG. 3, the cylindrical portion 10 and rotary member 12 are rotatably coupled together, and at the same time the rotary member 12 is retained against detachment from the cylindrical body 10 with the engagement projection 24 located on the inner side of the engagement projection 18.

Further, the operating fluid coated in this state spreads uniformly as it seeks out the gaps A between opposed surfaces of the two coupled parts, and its viscosity gives a resistance such that the rotation of the rotary member 12 relative to the cylindrical body 10 provides a uniform torque.

As a result of the increased distance to the open end of the cylindrical body 10, it is more difficult for the operating fluid coated on the sliding surfaces of the cylindrical body 10 and the rotary member 12 to leak out. Further, the engagement between the engagement projections 18 and 24 prevents leakage of the operating fluid from the open end of the cylindrical body 10.

As has been described in the foregoing, with the rotary oil damper according to the invention the gap at the open end of the cylindrical body is perfectly closed by the engagement between the engagement projection formed over the entire inner periphery of the cylindrical body adjacent to the open end and the ring-like engagement projection formed on the outer periphery of the rotary member, and this engagement also has an effect of retaining the rotary member against detachment from the cylindrical body.

Thus, according to the invention it is possible to eliminate torque variations apt to arise over long use. In addition, the rotary member is safe from becoming detached even when it experiences an axial tensile force, so that high safety can be ensured.

What is claimed is:

1. A rotary oil damper comprising a cylindrical body open at one end and a rotary member rotatably fitted in said cylindrical body, said cylindrical body having an engagement projection formed over the entire inner periphery adjacent to its open end, said rotary member also having an engagement projection formed on the outer periphery of said rotary member and engaged with said engagement projection of said cylindrical body to retain said rotary member against detachment from said cylindrical body, and said cylindrical body engagement projection including a radially inwardly projecting annular lip engaging a peripheral, circumferential surface of said rotary member spaced from said rotary member engagement projection, in order to promote closure of said open end of said cylindrical body.

2. The rotary oil damper according to claim 1, wherein said engagement projection on the inner periphery of said cylindrical body is formed by forming an undercut.

* * * * *